*Reissue.*

*L. P. Bradley. Tape Measure.*

4419

REISSUED JUN 13 1871

Witnesses:

Wm. H. C. Smith.

Alex F. Roberts

Inventor:

L. P. Bradley.

PER Munn & Co.

Attorneys.

UNITED STATES PATENT OFFICE.

LEWIS P. BRADLEY, OF NEW HAVEN, CONNECTICUT.

IMPROVEMENT IN TAPE-MEASURES.

Specification forming part of Letters Patent No. 92,573, dated July 13, 1869; reissue No. 4,419, dated June 13, 1871.

*To whom it may concern:*

Be it known that I, LEWIS P. BRADLEY, of New Haven, in the county of New Haven and State of Connecticut, have invented a new Improvement in Tape-Measures; and I do hereby declare that the following, when taken in connection with the accompanying drawing and the letters of reference marked thereon, to be a full, clear, and exact description of the same, and which said drawing constitutes part of this specification and represents, in—

Figure 1:
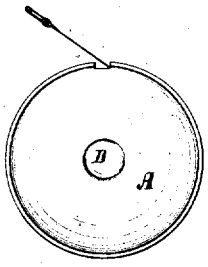
Figure 2:
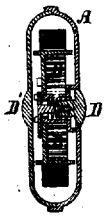
Figure 3:
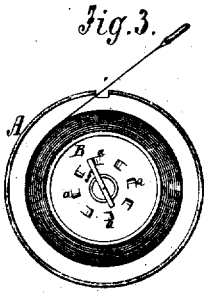

Figure 1, a side view; Fig. 2, a transverse section; Fig. 3, a longitudinal section; and in Fig. 4, a transverse section, the central portion enlarged.

This invention relates to an improvement in tape-measures such as are constructed for self-winding—that is, so that the tape pulled out will be returned by the reaction of a spring within the case; the object of the invention being an arrangement whereby the action of the spring may be arrested at any desired point, and hold the tape when withdrawn, so as to prevent its being rewound within the case. To this end the invention consists in the arrangement of a central knob or button in one side of the case, to which is fixed, upon the inside of the case, a bar, so that by pressing the knob inward the bar is raised from a notch or notches on the spring-cylinder to permit the action of the spring, so that when the pressure is removed from the knob the bar will fall into a notch or catch on the cylinder and prevent the reaction of the spring.

The object of arranging the knob or button for working the holding and releasing device in the center of the side of the case is to have it in such a position that, when the case is held by the thumb and finger of one hand for pulling out the tape by the other hand, the button may be taken by one or the other, (the finger or thumb,) so as to be manipulated for releasing the spring or catching it.

In order to the clear understanding of my invention, I will fully describe the same as illustrated in the accompanying drawing.

Figure 4:
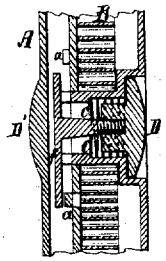

A is the case, within which is arranged a spring-cylinder, B, operating so that the tape is wound upon the outside of the cylinder by the action of the spring within. One side of the case is constructed so as to extend inward and form a bearing for the support of the cylinder, as seen in Figs. 2 and 4, and so that the cylinder will turn freely on the said bearing. One side of the cylinder is provided with one or more notches, *a*. Upon one side of the case, and centrally through the bearing C, is arranged a button or knob, D, to which is attached, upon the inside, a cross-bar, *f*; and a spring is arranged within the bearing C, as denoted in Figs. 2 and 4, the action of which spring is to force the knob outward and the bar *f* onto the cylinder, as seen in Fig. 2, in which position it engages with one of the notches *a*, as seen in Fig. 3, and prevents the reaction of the spring after the tape has been withdrawn; but when it is desirable to draw in or rewind the tape, press the button D inward, which forces the bar *f* from the notch on the spring-cylinder, as seen in Fig. 4; then the spring will react and wind the tape.

It will be seen that, on account of the case being oval on the sides, it will most naturally be grasped by the thumb and finger at the center for being held while pulling out the tape or guiding it back again—in fact, it cannot well be held in this way without. Therefore, if the button be arranged in any other position it will be difficult, if not impossible, to so hold the case, and, at the same time, manipulate it; whereas in this arrangement it is done with the greatest ease, especially if a knob or stud, D′, be placed in the center of the opposite side, as I propose to do, which, together with the button, form two center pivots by which the case is suspended between the thumb and finger.

I do not wish to be understood as broadly claiming a self-winding tape-measure, as such, I am aware, is not new; but What I do claim as my invention, and desire to secure by Letters Patent, is—

1. The arrangement of the spring-cylinder B within a case, A, combined with a knob, D, arranged through the bearing of the cylinder so as to operate the bar *f*, the whole operating in the manner herein set forth.

2. The knob for actuating the holding and releasing catch, arranged in the center of the case, substantially as specified.

LEWIS P. BRADLEY.

Witnesses:

GEO. W. MABEE,

ALEX. F. ROBERTS.